US008159369B1

(12) United States Patent
Koenigs et al.

(10) Patent No.: US 8,159,369 B1
(45) Date of Patent: Apr. 17, 2012

(54) WEATHER RADAR SYSTEM AND METHOD

(75) Inventors: Gregory J. Koenigs, Cedar Rapids, IA (US); Jeffery A. Finley, Cedar Rapids, IA (US); Jeremy S. Bredfeldt, Iowa City, IA (US); Kevin M. Kronfeld, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 373 days.

(21) Appl. No.: 12/474,102

(22) Filed: May 28, 2009

Related U.S. Application Data

(63) Continuation-in-part of application No. 12/075,103, filed on Mar. 7, 2008.

(51) Int. Cl.
*G08B 23/00* (2006.01)
(52) U.S. Cl. ...................................................... 340/963
(58) Field of Classification Search .................. 340/963, 340/949, 971, 973, 974, 969; 701/3; 342/63
See application file for complete search history.

(56) References Cited

U.S. PATENT DOCUMENTS

| | | | |
|---|---|---|---|
| 3,964,064 A | 6/1976 | Brandao et al. | |
| 4,283,725 A | 8/1981 | Chisholm | |
| 4,435,707 A | 3/1984 | Clark | |
| 4,555,703 A | 11/1985 | Cantrell | |
| 4,613,938 A | 9/1986 | Hansen et al. | |
| 4,835,536 A | 5/1989 | Piesinger et al. | |
| 5,049,886 A | 9/1991 | Seitz et al. | |
| 5,077,558 A | 12/1991 | Kuntman | |
| 5,198,819 A | 3/1993 | Susnjara | |
| 5,311,183 A | 5/1994 | Mathews et al. | |
| 5,311,184 A | 5/1994 | Kuntman | |
| 5,945,926 A | 8/1999 | Ammar et al. | |
| 6,154,169 A | 11/2000 | Kuntman | |
| 6,177,873 B1 | 1/2001 | Cragun | |
| 6,201,494 B1 | 3/2001 | Kronfeld | |

(Continued)

FOREIGN PATENT DOCUMENTS

EP 1 329 738 B1 7/2003
(Continued)

OTHER PUBLICATIONS

U.S. Appl. No. 12/075,103, filed Mar. 7, 2008, Woodell et al.
(Continued)

*Primary Examiner* — Phung Nguyen
(74) *Attorney, Agent, or Firm* — Donna P. Suchy; Daniel M. Barbieri

(57) ABSTRACT

An aircraft hazard warning system configured to provide an indication of a hazard level to an electronic display includes an input configured to receive first input data and second input data. The first input data includes at least one of lightning detection data, radar reflectivity data, turbulence data, geographic location data, vertical structure analysis data, and temperature data. The second input data includes at least one of aircraft speed data and wing loading data. The system further includes processing electronics configured to determine a hazard level of the aircraft based on the first input data. The processing electronics updates at least one characteristic of the hazard level based on the second input data. The processing electronics provides an indication of the hazard level and updated characteristic to the electronic display. For example, the characteristic can be a color of indicators representing the first input data and can be modified based on the second input data.

16 Claims, 8 Drawing Sheets

U.S. PATENT DOCUMENTS

| | | |
|---|---|---|
| 6,208,284 B1 | 3/2001 | Woodell et al. |
| 6,236,351 B1 | 5/2001 | Conner et al. |
| 6,240,369 B1 | 5/2001 | Foust |
| 6,381,538 B1 | 4/2002 | Robinson et al. |
| 6,388,607 B1 | 5/2002 | Woodell |
| 6,388,608 B1 | 5/2002 | Woodell et al. |
| 6,424,288 B1 | 7/2002 | Woodell |
| 6,456,226 B1 * | 9/2002 | Zheng et al. ................ 342/26 R |
| 6,512,476 B1 | 1/2003 | Woodell |
| 6,549,161 B1 | 4/2003 | Woodell |
| 6,577,947 B1 | 6/2003 | Kronfeld et al. |
| 6,597,305 B2 | 7/2003 | Szeto et al. |
| 6,603,425 B1 | 8/2003 | Woodell |
| 6,614,382 B1 | 9/2003 | Cannaday, Jr. et al. |
| 6,650,275 B1 | 11/2003 | Kelly et al. |
| 6,650,972 B1 * | 11/2003 | Robinson et al. ................ 701/3 |
| 6,667,710 B2 | 12/2003 | Cornell et al. |
| 6,670,908 B2 | 12/2003 | Wilson et al. |
| 6,677,886 B1 | 1/2004 | Lok |
| 6,690,317 B2 | 2/2004 | Szeto et al. |
| 6,703,945 B2 * | 3/2004 | Kuntman et al. ............ 340/961 |
| 6,741,203 B1 | 5/2004 | Woodell |
| 6,850,185 B1 | 2/2005 | Woodell |
| 6,879,280 B1 * | 4/2005 | Bull et al. ................... 342/26 B |
| 6,882,302 B1 | 4/2005 | Woodell et al. |
| 6,917,860 B1 | 7/2005 | Robinson et al. |
| 6,977,608 B1 * | 12/2005 | Anderson et al. ........... 342/26 B |
| 7,042,387 B2 | 5/2006 | Ridenour et al. |
| 7,129,885 B1 | 10/2006 | Woodell et al. |
| 7,307,583 B1 | 12/2007 | Woodell et al. |
| 7,486,219 B1 | 2/2009 | Woodell et al. |
| 7,515,087 B1 | 4/2009 | Woodell et al. |

FOREIGN PATENT DOCUMENTS

FR     2 658 617 A1    8/1991

OTHER PUBLICATIONS

U.S. Appl. No. 11/256,845, filed Oct. 24, 2005, Woodell et al.

Burnham et al., "Thunderstorm Turbulence and Its Relationship to Weather Radar Echoes," J. Aircraft, Sep.-Oct. 1969, pp. 438-445, vol. 6, No. 5.

Doviak, Richard J. et al., Doppler Radar and Weather Observations, 1984, Dover Publications, Inc., Mineola, New York.

"Transport Category Airplane Electronic Display Systems," Advisory Circular, Jul. 16, 1987, 34 pages, U.S. Department of Transportation, Federal Aviation Administration.

Waldvogel, A. et al., "The Kinetic Energy of Hailfalls. Part I: Hailstone Spectra," Journal of Applied Meteorology, American Meteorological Society, Apr. 1978, cover pages and pp. 515-520, vol. 17.

Zipser, E. et al., "The Vertical Profile of Radar Reflectivity and Convective Cells: A Strong Indicator of Storm Intensity and Lightning Probability?" America Meteorological Society, 1994, pp. 1751-1759.

* cited by examiner

WEATHER RADAR SYSTEM AND METHOD

CROSS-REFERENCE TO RELATED APPLICATIONS

This application is a continuation-in-part of and claims priority to co-pending U.S. patent application Ser. No. 12/075,103, filed on Mar. 7, 2008, which is herein incorporated by reference in its entirety.

BACKGROUND

This application relates generally to the identification of turbulence. More particularly, this application relates to the identification of turbulence by analysis of convective cells detected by aircraft hazard warning systems.

Hazardous weather is generally associated with convective weather cells. Convective weather cells can produce turbulence, high winds, lightning, hail, and other weather hazards. With the large amount of air traffic and rising fuel costs, pilots are interested in identifying convective cells (e.g., often hazardous weather) from non-convective cells (e.g., stratiform rain) so they do not unnecessarily avoid flight routes through non-hazardous weather. Convective cells can also provide dangerous and uncomfortable flight conditions for the crew and passengers.

Weather radar systems generally include an antenna, a receiver/transmitter circuit, a processor, and display. The processor is coupled between the display and the receiver/transmitter circuit. The receiver/transmitter circuit is coupled between the processor and the antenna. The processor provides transmit signals through the receiver/transmitter circuit to the antenna to transmit radar beams. The processor receives radar return signals derived from radar returns received by the antenna. The radar return signals are provided to the processor via the receiver/transmitter circuit.

Conventionally, pilots use weather radar systems to detect and avoid hazardous weather. The radar return signals are processed to provide graphical images to a radar display. The radar display is typically a color display providing graphical images in color to represent the severity of weather. Some aircraft systems also include other hazard warning systems such as a turbulence detection system. The turbulence detection system can provide indications of the presence of turbulence or other hazards.

Conventional aircraft hazard weather radar systems, such as the WXR 2100 MultiScan™ radar system manufactured by Rockwell Collins, Inc., have Doppler capabilities and are capable of detecting four parameters: weather range, weather reflectivity, weather velocity, and weather spectral width or velocity variation. The weather reflectivity is typically scaled to green, yellow, and red color levels that are related to rainfall rate. The radar-detected radial velocity variation can be scaled to a turbulence level and displayed as magenta.

Although radar-detected reflectivity and radar-detected velocity variation are correlated to aircraft hazards, they may not provide a complete picture to the pilot. For example, rainfall rates derived from radar reflectivity data are generally related to the most visible weather related advisory on the flight deck. However, heavy rain is not inherently hazardous to the aircraft. Heavy rain is displayed to the flight crew because it is often associated with true weather hazards such as lightning, hail, and turbulence. As another example, the airspeed of the aircraft may vary. The aircraft may be traveling faster or slower at given altitudes in a given area, increasing or decreasing the impact a hazard may have on the aircraft. As yet another example, the wing loading of the aircraft may vary, which may result in the aircraft being more or less prone to the effects of hazards on the aircraft.

Thus, there is a need for an aircraft hazard warning system and method capable of providing more accurate indications of hazard levels. Further, there is a need for an aircraft hazard warning system and method that adjusts hazard levels based on aircraft parameters. Further still, there is a need for a system and method of providing hazard levels to pilots based on airspeed, altitude, and the wing loading of the aircraft.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the present disclosure relates to an aircraft hazard warning system configured to provide an indication of a hazard level to an electronic display. The system includes an input configured to receive first input data and second input data. The first input data includes at least one of lightning detection data, radar reflectivity data, turbulence data, geographic location data, vertical structure analysis data, and temperature data. The second input data includes at least one of aircraft speed data and wing loading data. The system further includes processing electronics configured to determine a hazard level of the aircraft based on the first input data. The processing electronics updates at least one characteristic of the hazard level based on the second input data. The processing electronics provides an indication of the hazard level including the at least one updated characteristic to the electronic display.

Another embodiment of the present disclosure relates to a method of providing an indication of a hazard to an electronic aircraft display in an avionics system. The method includes receiving first input data including at least one of lightning detection data, radar reflectivity data, turbulence data, geographic location data, vertical structure analysis data, and temperature data. The method also includes receiving second input data including at least one of aircraft speed data, altitude, and wing loading data. The method further includes determining a hazard level of the aircraft based on the first input data, updating at least one characteristic of the hazard level based on the second input data, and providing an indication of the hazard level including the at least one updated characteristic to the electronic aircraft display.

Yet another embodiment of the present disclosure relates to an apparatus for providing an indication of a hazard to an aircraft display in an avionics system. The apparatus includes means for receiving first input data comprising at least one of lightning detection data, radar reflectivity data, turbulence data, geographic location data, vertical structure analysis data, and temperature data. The apparatus also includes means for receiving second input data comprising at least one of aircraft speed data, altitude, and wing loading data. The apparatus further includes means for determining a hazard level of the aircraft based on the first input data, means for updating at least one characteristic of the hazard level based on the second input data, and means for providing an indication of the hazard level including the at least one updated characteristic to the electronic aircraft display.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Referring generally to the FIGS, an aircraft hazard warning system or other avionics system may infer turbulence and change or adjust detection parameters as a function of other sensor information and geographical location. The hazard warning system can scale reflectivity with air temperature to better represent hazards from convective cells at altitudes above the freezing layer where reflectivity tends to fall off. The weather hazards vary greatly with geography. In some geographical regions, heavy rain may be typical while convective activity that produces turbulence, hail, and lightning may be rare. In other locations, storms rain out at low altitude and reflectivity at high altitude is very low even though the high altitude turbulence above the convective area is still present. Satellite data and worldwide test flight data may allow selection of display thresholds to better characterize weather threats at different geographic locations. The hazard warning system further can adjust the representation of hazards using data such as aircraft speed data and wing loading data.

By providing better weather interpretation, the hazard warning system may infer the nature or level of aircraft hazards such as hail, lightning, and turbulence from more basic sensor information. According to one exemplary embodiment relating to turbulence, the basic sensor information (e.g., radar measured spectral width) does not change with geographical location. The inferred turbulence, however, does change with geographical location.

The current regulatory environment as defined by governmental regulatory agencies supports display of basic radar sensor information as red, yellow, and green for radar reflectivity calibrated to rainfall rate and magenta as turbulence. The regulatory agencies do not currently provide guidance for changing the definition of the radar display based on inferred hazards. The radar display format may be selected to display radar colors consistent with turbulence and rainfall rate as currently defined by regulatory authorities or as defined in the future by such authorities. A hazard assessment indication can be provided in a manner that does not interfere with display of standard weather data. Further, the use of data such as aircraft speed data and wing loading data may be used to more accurately assess the danger a particular hazard may present. For example, a hazard generally configured to show as yellow on a radar may be displayed as red if aircraft data suggests a low wing-loading or high aircraft speed may increase the risk to the aircraft.

Figure 1A:
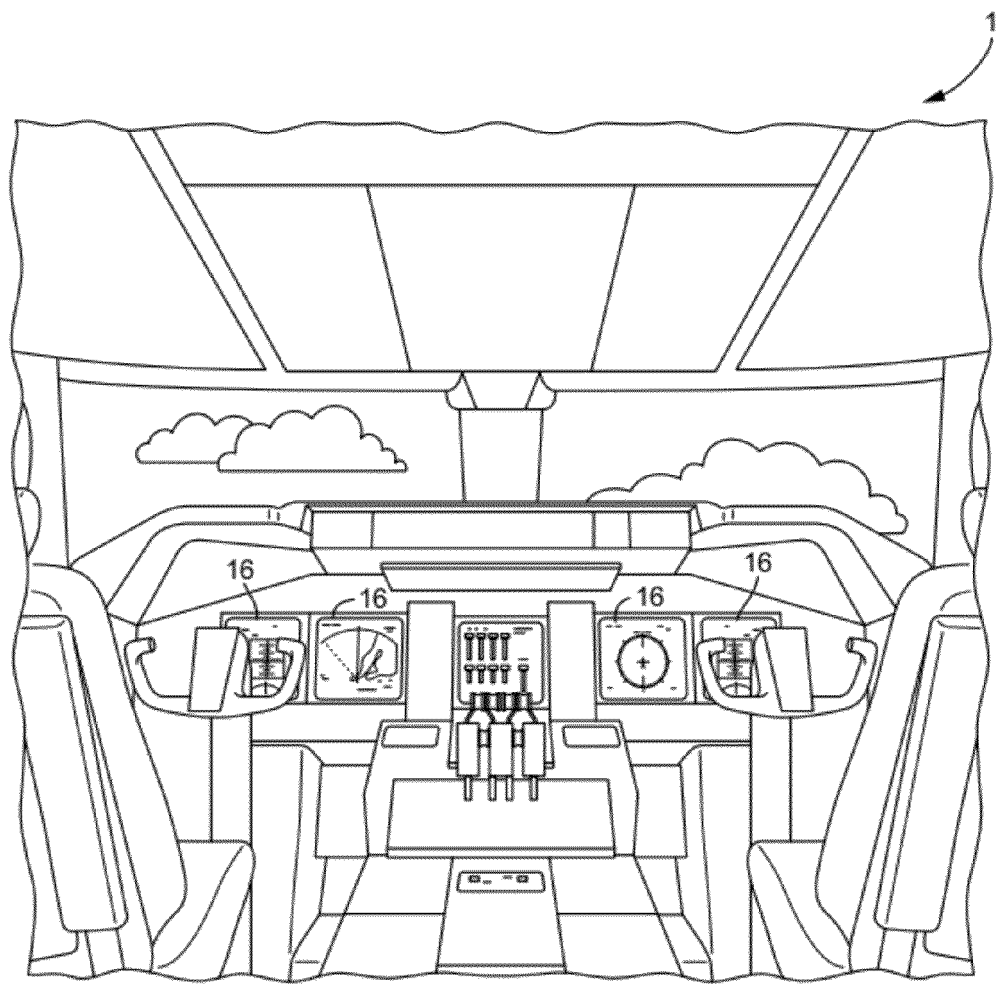
FIG. 1A is an environment view of an aircraft control center of an aircraft with an electronic display, according to an exemplary embodiment.

Referring now to FIG. 1A, an illustration of an aircraft control center or cockpit 1 of an aircraft is shown, according to one exemplary embodiment. Aircraft control center 1 includes flight displays 16 which are used to increase visual range and to enhance decision-making abilities. In an exemplary embodiment, flight displays 16 may provide a rendered display from the systems and methods of the present disclosure. According to an exemplary embodiment, the systems and methods of the present disclosure may be used for a flight display of an aircraft. According to various other exemplary embodiments, the systems and methods of the present disclosure may be used by any system in any other embodiment for rendering computer graphics and displaying an output, (e.g., in another aircraft, a space vehicle, a ground vehicle, or in a non-vehicle application, etc.).

Figure 1B:
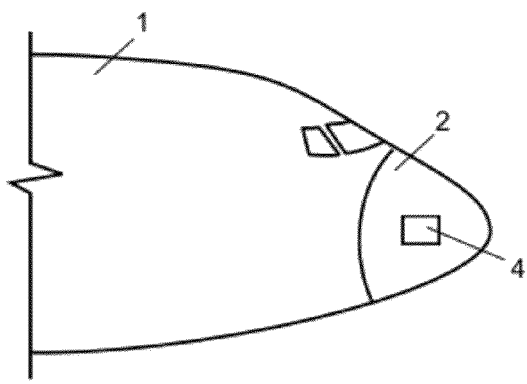
FIG. 1B is an environment view of a radar system and nose of the aircraft of FIG. 1A, according to an exemplary embodiment.

Referring now to FIG. 1B, the front of an aircraft is shown with aircraft control center 1 and nose 2, according to an exemplary embodiment. A radar system 4 or other system is generally located inside nose 2 of the aircraft. According to other exemplary embodiments, radar system 4 may be located on the top of the aircraft or on the tail of the aircraft. According to one exemplary embodiment, radar system 4 is a weather radar configured to provide weather information to flight displays 16 for use by a user of the aircraft. Radar system 4 may be any radar system configured to detect information for the systems and methods of the present disclosure.

Figure 1C:
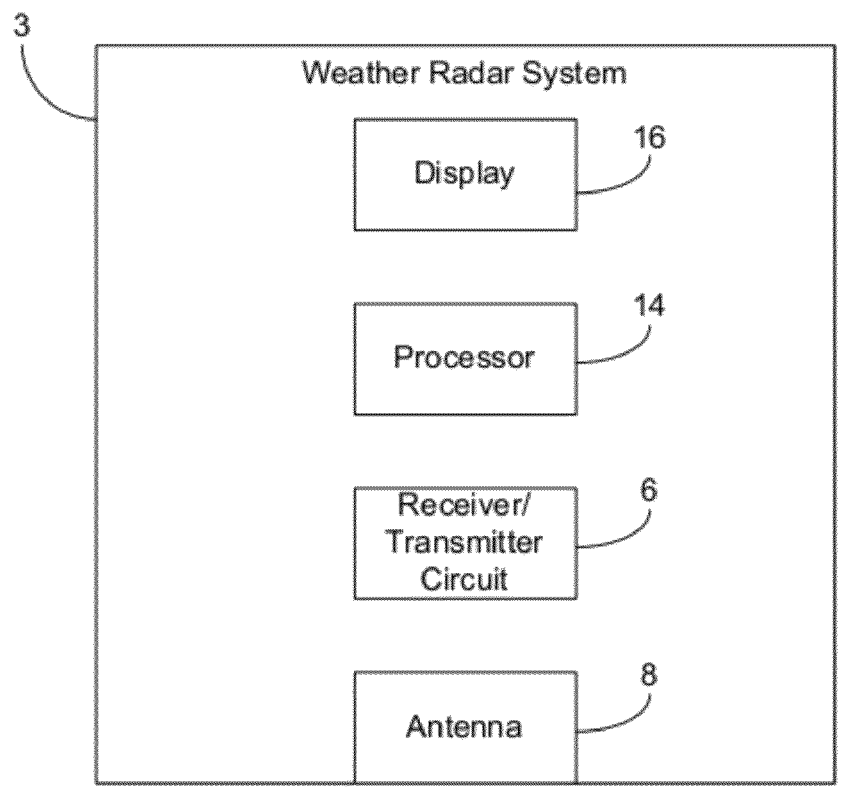
FIG. 1C is a block diagram of a weather radar system, according to an exemplary embodiment.

Referring to FIG. 1C, a block diagram of a weather radar system 3 that may be used with the systems and methods of the present disclosure is shown, according to an exemplary embodiment. Weather radar system 3 generally includes a receiver/transmitter circuit 6 and antenna 8. According to an exemplary embodiment, circuit 6 and antenna 8 may be located in the nose 2 or another area of the aircraft. Weather radar system 3 also includes a display 16 (e.g., the display of FIG. 1A) and a processor 14. Processor 14 is coupled between display 16 and receiver/transmitter circuit 6. Receiver/transmitter circuit 6 is coupled between processor 14 and antenna 8. Processor 14 provides transmit signals through receiver/transmitter circuit 6 to antenna 8 to transmit radar beams. Processor 14 receives radar return signals derived from radar returns received by antenna 8. The radar return signals are provided to processor 14 via the receiver/transmitter circuit.

According to an exemplary embodiment, processor 14 includes processing electronics for executing the systems and methods of the present disclosure. In the embodiment of FIG. 1C, processor 14 and display 16 may be part of a hazard warning system as described in subsequent FIGS. According to an exemplary embodiment, processor 14 may be generally configured to receive data relating to various potential hazards (e.g., precipitation, lightning, turbulence, temperature, vertical structures, and other obstacles) and to determine a hazard level based on the inputs. Processor 14 may be further configured to receive data relating to an air speed, altitude, or wing load of the aircraft, and may adjust a determined hazard level based on the inputs.

Figure 2:
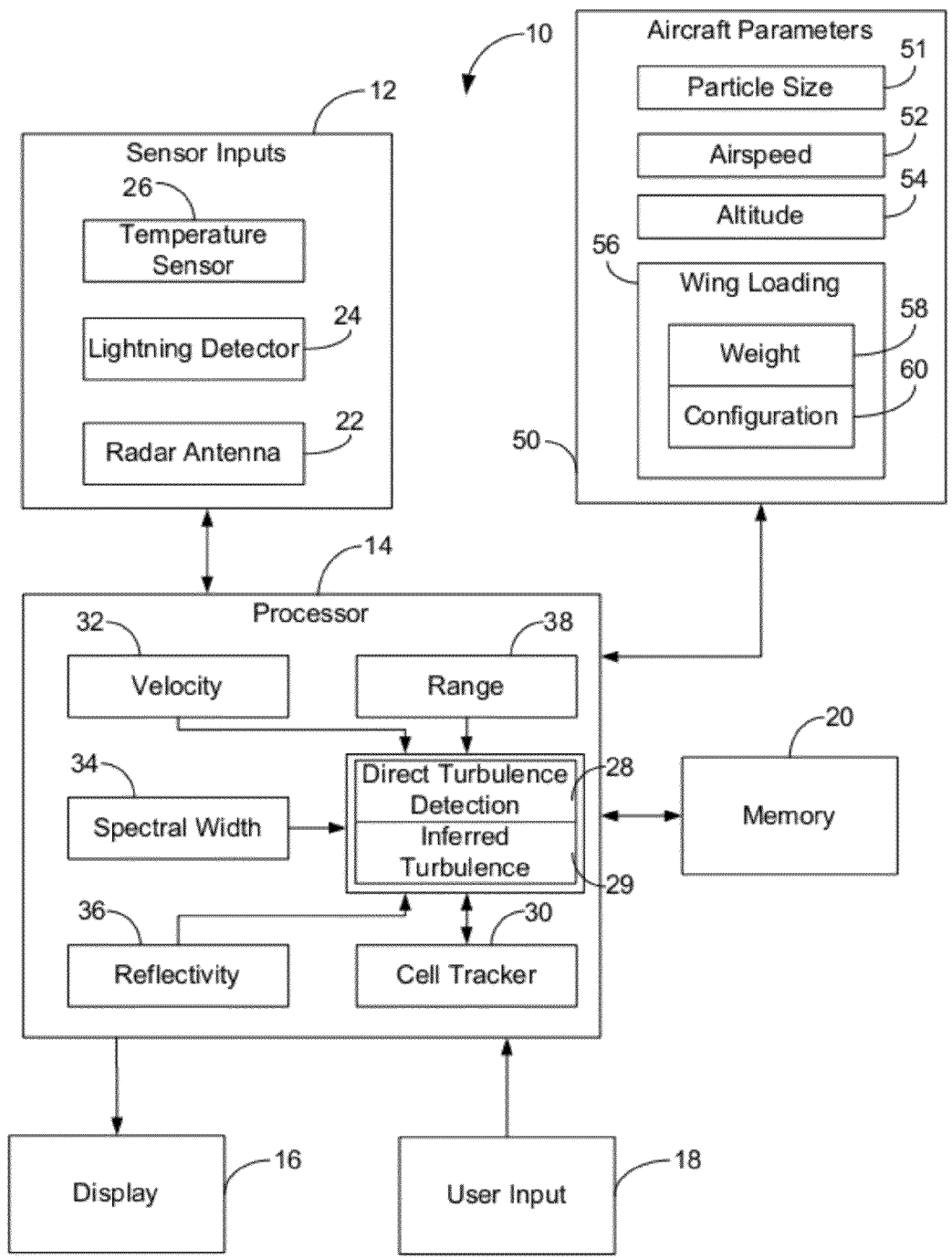
FIG. 2 is a block diagram of a hazard warning system, according to an exemplary embodiment.

Referring to FIG. 2, a block diagram of a hazard warning system is shown, according to an exemplary embodiment. A weather radar system or hazard warning system 10 includes sensor inputs 12, a processor 14, a display 16, a user input 18, a memory 20, and sensors for measuring and calculating aircraft parameters 50. Hazard warning system 10 may acquire horizontal and/or vertical reflectivity profiles and direct turbulence detection information via sensor inputs 12. Sensor inputs 12 generally include a radar antenna 22, a lightning detector 24, and a temperature sensor 26. According to other exemplary embodiments, sensor inputs 12 may include any type of sensor or detector that may provide data related to direct or inferred measurement or detection of weather conditions and/or hazards. Hazard warning system 10 may additionally acquire various data from aircraft parameters 50. Aircraft parameters 50 may include particle size data 51, an airspeed or aircraft speed 52 data for the aircraft, an altitude 54 of the aircraft, and wing loading 56 data, including the weight 58 and configuration 60 of the aircraft.

Aircraft parameters 50 includes the aircraft speed or airspeed 52 of the aircraft. The aircraft speed may influence the impact of hazards to the aircraft. The aircraft speed may be variable based on the conditions surrounding the aircraft, and the turbulence of the aircraft may vary as a result. The faster an aircraft approaches and penetrates the turbulence, the more damage the aircraft may incur from hazards. Additionally, if an aircraft penetrates an area of turbulence at a high speed, raindrops or ice crystals (or other precipitation) may hit the aircraft at a higher speed and cause more damage to the aircraft than precipitation at lower speeds. Particle size data 51 may include air particles, precipitation, obstacles, etc. Larger particles may cause a higher hazard level than smaller particles. Altitude data 54 may include data about the altitude of the aircraft. Particle size data 51 and altitude data 54 may be used to determine a hazard level relating to aircraft speed 52 (e.g., the faster the aircraft is traveling, the more impact particle size data 51 has on the hazard level).

Wing loading 56 may also influence the effect turbulence related hazards have on an aircraft. A lighter wing load may generally cause a higher hazard level than a heavier wing load. Lighter wing-loaded aircrafts have little inertia for the amount of lift force which can be applied to an aircraft wing, allowing for turbulence to impact the aircraft more severely. Various configuration 60 data may impact the wing loading of the aircraft. For example, flap configuration, landing gear position, speed brake status, spoiler configuration, wing size, wing geometry, and the like may change the aircraft wing loading and, thus, the effective hazard associated with a specific turbulence environment.

Lightning detector 24 may be an airborne lightning sensor that provides polarity, strike rate, range, bearing, strike strength, lightning type (e.g., cloud to cloud, cloud to ground, etc.), and rate history for each lightning flash relative to the aircraft. Detector 24 can derive a range interval from the amplitude information. Lightning detector 24 is a lightning sensor that can be integrated within system 10 or be a separate unit from system 10. Lightning detector 24 can be aboard the aircraft associated with system 10 or can be an onboard system communicating wirelessly with system 10.

Alternatively, lightning data can be provided from ground based systems or other systems not aboard the aircraft. The lightning data can be correlated with respect to the present location of the aircraft for comparison with other weather data sensed by other sensors, such as weather radar systems, optical sensors, etc.

Detector 24 preferably provides lightning data indicative of the presence and/or location of lightning strikes. The lightning data can be raw data from detector 24 or processed data that indicates a location and presence for each lightning strike and the rate of lighting strikes in a given cell. In one embodiment, the lightning data points toward or indicates the bearing of detected lightning strikes. The lightning sensor may also provide inferential information related to turbulence and/or hail.

Lightning detector 24 is preferably a Storm Scope™ lightning sensor, narrow band optical imaging system, or other sensor for determining the presence of lightning strikes. Detector 24 preferably also provides a bearing to lightning strikes and an estimated location of lightning strikes. Detector 24 may also provide lightning strike rate, polarity of lightning strike and lightning strike type: cloud-to-ground, cloud-to-cloud, etc. In one example, the lightning detector can be an LD-250 lightning detector configured for communication with detector processor 14.

In one embodiment, detector 24 provides the data in range and azimuth form to processor 14 indicating the location and presence of lightning strikes or at least the bearing from the aircraft to the lightning strike. Alternatively, processor 14 can obtain raw data from lightning detector 24 and determine presence and location of lightning strikes from the raw data.

Detector 24 can be a detector purchased from Boltek Company or L3 modified to be used with system 10. In one embodiment, detector 24 is simplified by only providing angle to lightning strike information so that detector 24 can be of a simpler and less expensive wideband ADF design.

An antenna for detector 24 can be located at a base of a pedestal boom and utilize the pedestal power associated with aircraft hazard warning system 10 and its interface to a remote or wireless radar transceiver circuit. In addition, the antenna for detector 24 can use the current weather radar mechanical pedestal structure associated with radar antenna 22.

The hybrid approach of hazard warning system 10 correlates radar reflectivity and lightning data to overcome the shortcomings of the lightning strike inaccuracy. The hybrid approach determines lightning strike position relative to radar reflectivity measurements, with sufficient accuracy, to make a convective assessment on a weather event.

Processor 14 is generally configured to process data received from sensor inputs 12 and aircraft parameters 50 to determine a hazard threat level, receive input from user input 18, and provide a hazard indication on display 16. Processor 14 includes turbulence detector 28, inferred turbulence detector 29, and cell tracker 30. Processor 14 can generate a velocity parameter 32 or other Doppler data, a spectral width parameter 34, a reflectivity parameter 36, and a range parameter 38 based on return data from sensor inputs 12, aircraft parameters 50, data or commands from user input 18, or data or instructions from memory 20. According to various exemplary embodiments, processor 14 can be any hardware and/or software processor or processing architecture capable of executing instructions and operating on data related to hazard detection. According to various exemplary embodiments, memory 20 can be any volatile or non-volatile memory capable of storing data and/or instructions related to hazard warning system 10.

Direct turbulence detector 28 is configured to provide turbulence data based on a direct measurement of spectral width, for example spectral width parameter 34, from radar antenna 22. A large spectral width corresponds to turbulence. Direct turbulence detector 28 can provide a turbulence hazard indication on display 16.

Inferred turbulence detector 29 is configured to provide inferred or unmeasured turbulence data using measured data. Inferred turbulence detector 29 can receive data inputs derived from one or more of spectral width parameter 34, reflectivity parameter 36, and/or range parameter 38.

Inferred turbulence detector 29 can also receive temperature data from temperature sensor 26 and data from lightning detector 24. Temperature data can include a local atmospheric temperature, local temperature variations with time, local temperature variations with altitude, a remotely determined temperature, and/or remotely determined temperature gradients in either range or altitude. Detector 29 can further receive data from aircraft parameters 50 relating to the airspeed or altitude of the aircraft and properties relating to the wing loading of the aircraft.

The detection of lightning generally indicates the presence of a convective cell and of turbulence within the cell. Detection of a single lightning bolt can infer the presence of turbulence. The use of lightning history data may provide a more accurate inferred turbulence assessment. If lighting history indicates a high lighting strike rate in a given cell the probability of turbulence with high magnitude within that cell is high. Furthermore, if the lightning history indicates that the lightning strike rate is increasing or decreasing in a given cell, then the probability of turbulence with high magnitude associated with the cell is correspondingly increasing or decreasing.

Reflectivity parameter 36 can include data related to area reflectivity, gradient reflectivity, magnitude reflectivity, reflectivity shape, and/or a sharp change in reflectivity. Very high gradients (e.g., rapid changes from red to black to yellow) can indicate the presence of a convective cell and thus turbulence. According to one exemplary embodiment, the very high gradient may be a change in cell reflectivity within a few range bins (e.g., one nautical mile). According to another exemplary embodiment, the very high gradient may be a change in cell reflectivity within three nautical miles.

If a cell is detected to be growing at a very high rate, it may be a convective cell with associated turbulence. If a cell is detected that has grown at a very high rate in the past, the cell may be convective and contain turbulence. For example, the growth may be detected by a vertical structure analysis. The vertical structure analysis data may include vertical height, vertical growth rate, a vertical history assessment, an assessment of whether the aircraft path will intersect a portion of a weather cell, and/or cell maturity data.

Inferred turbulence detector 29 can process at least one of parameters 34, 36, 38 and/or data from detector 24 to provide a turbulence hazard indication on display 16. In addition, inferred turbulence detector 29 can cause system 10 to perform further analysis in response to information from lightning detector 24 and/or a parameter 34, 36, 38. The further analysis can even include causing system 10 to perform weather radar queuing and control in elevation and azimuth as well as examining new data or historical data. Inferred turbulence detector 29 can provide inferred turbulence data at longer ranges from measurements that are not directly detected by direct turbulence detector 28. Advantageously, detector 29 allows system 10 to provide notice of turbulence at both short ranges (e.g., within 25 nmi, within 40 nmi, within 50 nmi, etc.) and long ranges (e.g., greater than 25 nmi, greater than 40 nmi, greater than 50 nmi, up to 75 nmi, up to 100 nmi, up to 320 nmi, etc.). Detector 29 merges turbulence analysis from direct detections and inferred detections to give an overall awareness of turbulence throughout the range of system 10.

Threat descriptions on display 16 can include lightning, hail, and turbulence. All three hazards can have substantial impact on airline operations. In one embodiment, the display of turbulence and potential lightning may be paired with entire cells and circled by a line of the normal turbulence color at lower levels of hazard. Regions of likely lightning and directly measured turbulence may use either a solid second level turbulence color or be encoded with an icon. Preferably, display 16 allows slewing from the full cell identification of convective weather at long ranges to shorter range sub-cell size regions of a likely hazard.

After acquiring data from sensor inputs 12 and aircraft parameters 50, processor 14 may use a variety of processing techniques to assess the weather hazard level. Processor 14 may identify and track relevant weather cells via cell tracker 30. The cells may be prioritized in terms of their threat to the aircraft and detailed vertical scans can be conducted on high priority targets.

Conventional radar systems scale return power to display color without regard to the nature of the weather target being scanned. In contrast, hazard warning system 10 scales its return power system with respect to a height above the freezing layer as well as by geographic location. At low altitudes, liquid precipitation may produce very high radar reflectivity. As altitude increases, the temperature and corresponding radar reflectivity generally undergo a decrease. At cruise altitudes where hazard warning system 10 is primarily scanning ice crystals, the radar reflectivity may drop two or more color levels or disappear entirely from the display. Processor 14 uses outside air temperature measurements to estimate height relative to the freezing layer where highly reflective water droplets change to more poorly reflective ice crystals. Processor 14 can automatically modify or update the display color thresholds to provide a more uniform measure of the atmospheric moisture content regardless of whether the moisture occurs as ice or liquid water.

Weather cell reflectivity also varies with geographical location. For example, equatorial oceanic weather cells tend to have significantly different characteristics than continental and convective land based weather. Oceanic cells on the average have 23 dBZ (two and ½ color levels) less reflectivity at cruise altitudes than equivalent land based cells. This translates to only 1/200th as much radar echo from oceanic weather as compared to weather over land. This difference causes oceanic weather to be essentially invisible to conventional radar systems at cruise altitudes even though turbulence hazards may still exist high in a convective cell or storm.

Though the weather cell reflectivity varies with geographical location, the hazards associated with convective activity remain similar across the world. Processor 14 compensates for localized weather reflectivity profiles by automatically modifying operating parameters (e.g., antenna beam tilt, color thresholds, etc.) based on aircraft position data. These adjustment techniques complement existing government regulatory documentation that defines color levels based on rainfall rate. Since hazard warning system 10 compensates weather trends due to geographical location, it provides a more accurate assessment of the atmospheric moisture content and thus, a more accurate representation of the weather threats.

Knowing the vertical extent of a weather cell can aid a pilot's decision whether to proceed through, or maneuver around a cell. Weather cell tops generally produce weak radar returns. Conventional radars sample weather cell tops using radar beams that are large in diameter with respect to the vertical accuracies desired. These two constraints may require a radar design that carefully optimizes the sampling in the upper regions of storm cells.

Some radars have used a multi-elevation process to estimate the vertical characteristics of weather cells. In order to minimize latency this multiple bar method may only perform a few horizontal scans separated by several degrees and still spend most of its time scanning empty space. The coarse spacing in elevation that produces acceptable latencies provides poor vertical accuracy when mechanized to detect storm top and storm growth.

Hazard warning system 10 may surpass the limitations of the multi-elevation process by separating the horizontal and vertical scanning and assessment process. Hazard warning system 10 may automatically identify weather cells and direct dedicated, fully stabilized vertical scans for each tracked weather cell to provide a high resolution assessment of each cell's vertical extent. Weather cell vertical scans may be prioritized based on their threat to the aircraft. Flight path segments, aircraft track angle, and/or pilot directed scan angles may be similarly scanned and estimated. Weather cells and any flight path or pilot commanded headings may be continuously rescanned to provide timely information.

In addition to direct reflectivity and turbulence data, hazard warning system 10 can utilize lightning detector 24 to directly sense lightning threats to the aircraft. Conventional airborne lightning sensors are generally proficient at detecting the direction of the electrical discharges, but are generally poor at determining range to the discharge. Since lightning is typically associated with convective weather cells, processor 14 can identify regions of reflectivity along the heading indicated by lightning detector 24 and correct the lightning sensor range estimates to the nearest convective cells.

Processor 14 uses the presence of lightning to infer information about hail. Weather cells that do not have enough updraft energy to produce lightning typically do not produce hail. According to another exemplary embodiment, radar return strength combined with temperature and altitude information can be used to infer hail. If a height of 1.4 km above the zero degree centigrade point in the atmosphere has radar reflectivity greater the 45 dBz, hail formation may be likely. The temperature/altitude algorithm may be used to infer both the likelihood of hail and the likely maximum hail diameter.

The presence of lightning within a weather cell may be sufficient to identify the cell as turbulent. Lightning is the result of atmospheric charge separation. The charge separation occurs as the result of friction between particles in regions of strong, turbulent, and/or shearing winds. Since lightning can be detected and correlated with storm cells at ranges of 100 miles or more, lighting detection can be used as an inferential turbulence indicator at ranges beyond the ability of radars using only conventional spectral width estimates.

Figure 3:
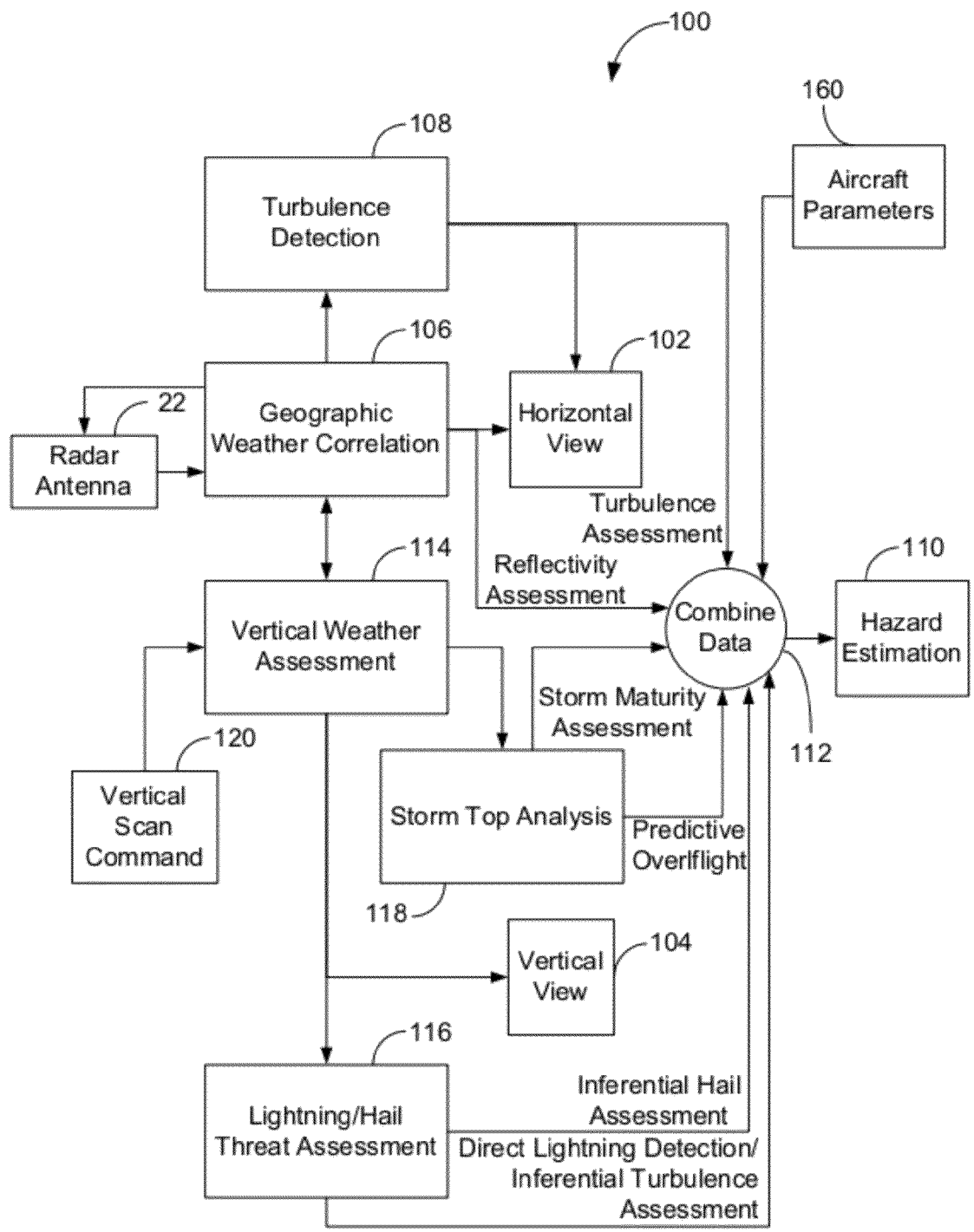
FIG. 3 is a functional flow diagram of various processes executed in the hazard warning system of FIG. 2, according to an exemplary embodiment.

Referring to FIG. 3, a radar processing functional flow chart of a process 100 for hazard warning system 10 is illustrated. Display 16 may be divided into a horizontal view 102 and a vertical view 104. The two independent views 102, 104 may include independent mode, range, and gain parameters.

The weather depiction on horizontal view 102 includes color patterns consistent with typical rainfall rate displays except the radar reflectivity is corrected to normalized atmospheric moisture content as described previously. Turbulence is sensed based on radar spectral width and scaled to aircraft RMS vertical load.

A hazard estimation 110 is generated from the sum or other combination 112 of the data outputs from measured and inferred functions including aircraft parameter measurement and calculation (process 160), direct turbulence detection (process 108), reflectivity measurement (process 106), lightning and inferred turbulence measurement (process 116), hail probability assessment (process 116), and/or storm growth assessment (process 118 and process 114) in order to generate an overall hazard assessment at each horizontal location. Each of the measurements or assessments from processes 160, 106, 108, 114, 116, and 118 may individually or in any combination provide an assessment of an inferred turbulence hazard. The assessment can be depicted on horizontal view 102 as an icon or as a specific color. The icon may be transparent to the underlying red/yellow/green radar display and capable of being turned off. Other exemplary embodiments may include textual blocks depicting tops of tracked storm cells and/or dithered regions that alert the crew to storms growing into the flight path (e.g., predictive overflight).

The hazard assessment display can be any combination (e.g., linear or nonlinear combination) of all the inputs. Alternately, each individual hazard component (e.g., lightning, inferred turbulence, direct turbulence, inferred hail, etc.) may be displayed individually. According to one exemplary embodiment, inputs from processes 106, 108, 114, 116, and 118 may be combined to form a hazard estimation, and inputs from process 160 for aircraft parameters may be used to modify or update the created hazard estimation to form hazard estimation 110.

Hazard warning system 100 identifies storm cells (process 114) and may automatically direct vertical scan commands 146 toward the cells in order to better assess the convective nature, maturity, and/or probability of the aircraft intercepting the cell top or turbulent bow wave above the cell (process 118). Process 114 prioritizes the directed vertical scan commands 146 based on the threat to the aircraft. The factors considered in cell prioritization may include crew selected vertical scan or automated directed scan history, cell reflectivity, cell hazard potential, cell proximity to the aircraft, cell proximity to the current track, cell proximity to the FMS flight path, etc.

The cell prioritization may be applicable to automatically directed vertical or horizontal scans. A vertical scan associated with the crew selected vertical scan (e.g., vertical scan command 120) may be the highest priority vertical function.

Vertical view 104 shows vertical cut sets along the flight plan, track angle, and/or crew commanded azimuth angle (process 114) as a result of the crew selecting a vertical scan command 120. The colors generally represent rainfall rate with reflectivity scaled to atmospheric moisture content in the same way as in horizontal view 102. Other exemplary embodiments may include an icon depiction of storm top uncertainty and/or an icon arrow that shows growth rate.

Figure 4A:
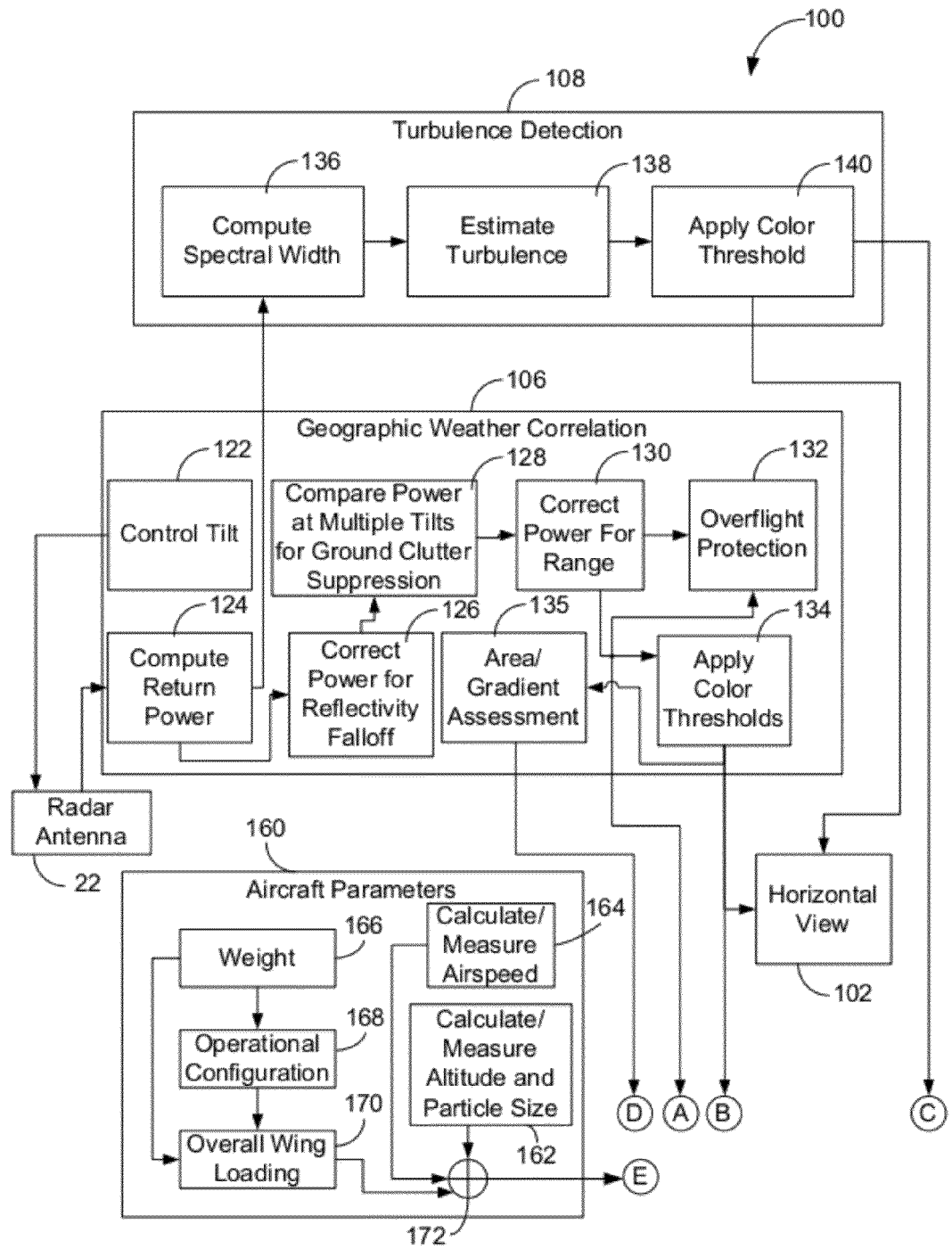
FIGS. 4A-B are more detailed versions of the function flow diagram of FIG. 3, according to exemplary embodiments.
Figure 4B:
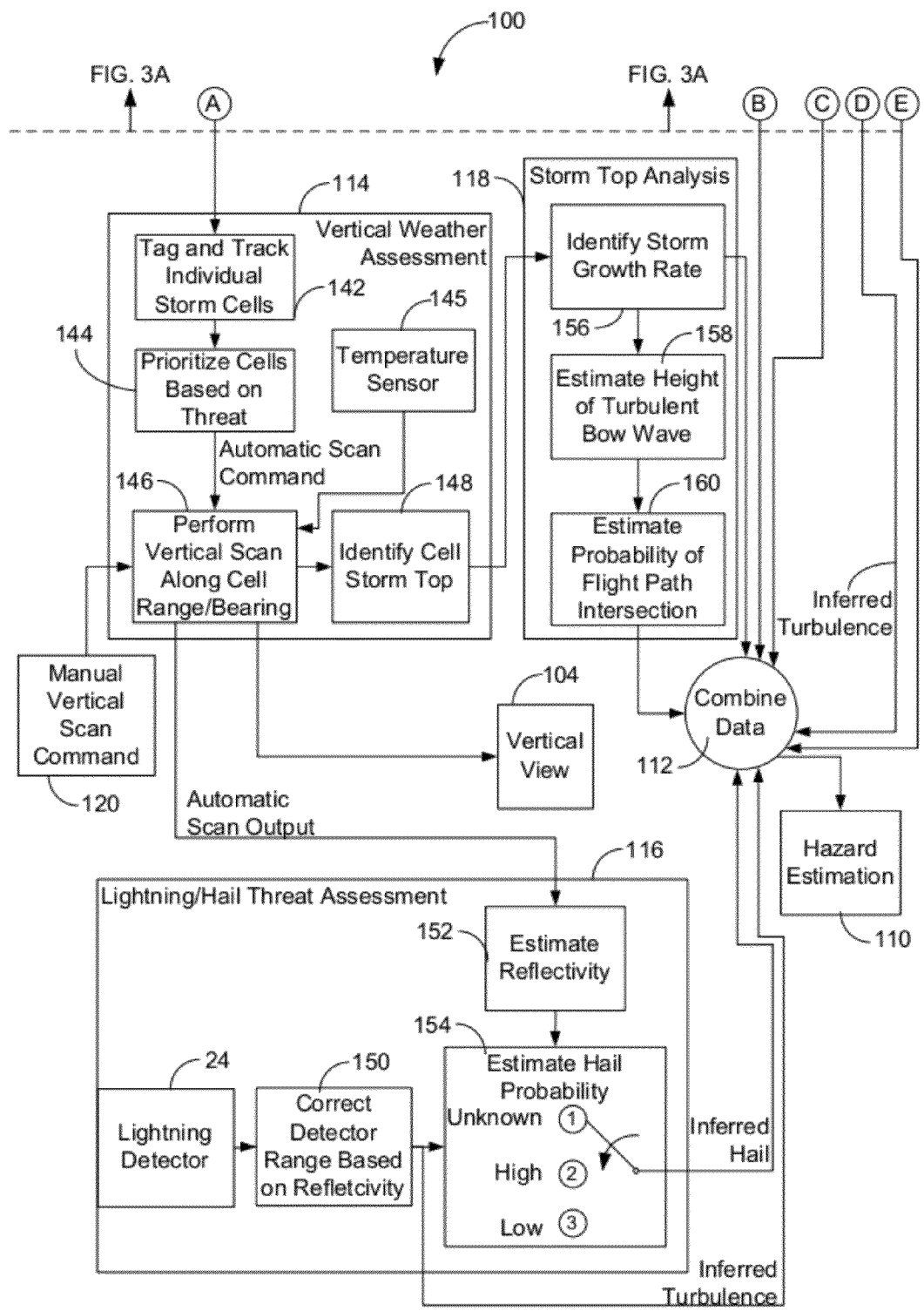

Referring to FIGS. 4A and 4B, a more detailed version of radar processing functional flow 100 of FIG. 3 is illustrated. In the geographic weather correlation process 106, the tilt of radar antenna 22 may be controlled (step 122). The power of the radar returns from antenna 22 are computed (step 124) and corrected for reflectivity falloff (step 126), for example due to elevation above a freezing layer or geographic location. Return power for multiple radar antenna angles is compared to suppress ground clutter and false returns (step 128). The radar power is corrected for range (step 130) and an overflight protection algorithm is run (step 132) that retains power data at specified ranges, for example less than ten nautical miles. Based on the overflight protection data (step 132) and the corrected power (step 130), color thresholds are applied based on regulatory specifications (step 134), as described above, for display on horizontal view 102 and for output as a reflectivity assessment to data combination 112. Cell area and reflectivity gradient are assessed (step 135) in order to generate an inferred turbulence assessment which is provided to data combination 112.

In the turbulence detection process 108 (e.g., direct turbulence detection), the computed return power (step 124) is used to compute the spectral width of the return (step 136). The spectral width is used to estimate the turbulence in units scaled to the aircraft RMS vertical load (step 138). Color thresholds are applied to the turbulence estimate based on regulatory specifications (step 140), for display on horizontal view 102 and for output as a turbulence assessment to data combination 112.

In the aircraft parameter measurement and calculation process 160, an altitude of the aircraft and particle size data for particles surrounding the aircraft may be calculated or measured (step 162). A speed of the aircraft may be calculated or measured (step 164). Process 160 may further include steps for calculating or measuring a weight (step 166) and other configuration data (step 168) of the aircraft. Configurations may include a flap setting or configuration, landing gear position, spoiler position or configuration, speed brake status, wing size, wing geometry, and the like. Steps 166-168 may be used to calculate an overall wing loading effect on the aircraft (step 170). The overall wing loading effect, altitude and particle size, and airspeed may be combined at a step 172 to determine an overall effect of aircraft parameters on the aircraft.

The vertical weather assessment process 114 tags and tracks individual storm cells (step 142) based on the corrected power from the geographic weather correlation process (step 130). The storm cells are prioritized based on the threat to the aircraft (step 144). Based either on a manual vertical scan command or an automatic scan command, system 10 performs a vertical scan along a cell range and bearing (step 146). If the vertical scan was manually commanded by the crew (step 120) the vertical scan data is output to vertical view 104 for display and use by the crew. If the vertical scan was an automatic scan, the data is also output to the lightning/hail threat assessment process 116. The vertical scan data is also used to identify the top of the storm cell (step 148).

Lightning/hail threat assessment process 116 uses lightning detector 24 to gather lightning data. The range of detector 24 is corrected based on radar reflectivity considerations (step 150). The range-corrected data is output to data combination 112 as a direct lightning detection and/or an inferential turbulence detection assessment. The automatic scan output data (step 146) is used to estimate the reflectivity at a specified distance above or below the freezing layer (step 152), for example 1.4 km above the freezing layer. Based on the reflectivity estimate (step 152) and the corrected data (step 150), system 10 makes an estimate of hail probability (step 154). The probability decision is at an unknown state by default and may change to a state of high probability if the reflectivity estimate is greater than a predetermined threshold, for example if the reflectivity estimate 1.4 km above the freezing layer is greater than 45 dbZ. If there is no lightning detected the hail probability changes to a low probability state. The estimated hail probability is output as an inferential hail assessment to data combination 112.

Storm top analysis process 118 uses the identified cell storm top data (step 148) and identifies the storm growth rate (step 156). The storm growth rate data is output as a storm maturity assessment to the data combination 112 and used to estimate the height of a turbulent bow wave associated with the storm cell (step 158). System 10 then estimates the probability that the aircraft flight path will intersect the turbulence bow wave or storm cell (step 160) and outputs the estimate as a predictive overflight assessment to combined data 112.

Hazard estimation 110 is generated from the sum or other combination 112 of the measured and inferential data to generate an overall weather hazard assessment. The hazard estimation summation function may weight the individual measured or inferential data based upon their relative importance to the weather hazard assessment. The assessment can be depicted on horizontal view 102 as an icon or specific color. The icon may be transparent to the underlying red/yellow/green radar display and capable of being turned off. Other exemplary embodiments may include textual blocks depicting tops of tracked storm cells and/or dithered regions that alert the crew to storms growing into the flight path (e.g., predictive overflight).

According to an exemplary embodiment, combination 112 operates as a logical OR function with respect to inferred turbulence determined from a radar reflectivity measurement, lightning measurement, hail probability assessment, storm growth or vertical structure analysis assessment, geographic location data, and/or temperature data. Alternatively, any combination 112 can operate as a logical AND function with respect to certain types of assessments or parameters, certain types of assessments or parameters at certain ranges, or certain types of assessments or parameters at certain altitudes. These and other logical functions (e.g., NOR, NAND, XOR, etc.) can be combined in any manner to provide the most appropriate inferred turbulence indication.

Cell reflectivity, after being compensated for temperature at altitude and geographical location, may be used for cell identification and tracking According to one exemplary embodiment, the cell tracking algorithm may store and/or track about 32 individual cells. According to other exemplary embodiments, more or fewer than 32 individual cells may be stored and/or tracked.

Cell reflectivity may be used in cell hazard assessment but other factors such as presence of lightning, presence of turbulence, probability of hail, storm maturity, storm growth, and/or vertical extent from previous vertical scans may also be included.

Highly reflective cells within about twenty nautical miles of the aircraft may be relevant regardless of where they lie relative to the aircraft flight path or heading. Tactical decisions may force the crew to deviate from the flight path and the crew should have the best available short range radar to support these tactical maneuvers.

Beyond twenty nautical miles, highly reflective cells may be prioritized based on their proximity to the current track out to the limits of the current flight plan segment. If the current track shows significant lateral deviation from the FMS flight plan, cells can be reprioritized based on current track angle rather than flight plan angle. Highly reflective cells may be prioritized based on their proximity to flight path segments beyond the current flight segment.

Though the vertical scans (both automatic and manual) may provide useful tactical information, the vertical functions do have limitations. In general, the resolution of the vertical data being collected and displayed may have an error rate that increases with range. Three primary errors affect the radar's ability to accurately determine storm height: error due to beamwidth, error between tilt samples, and error due to the difference between radar detectible storm top and turbulent bow wave.

The 3 db two way beamwidth of an air transport class radar antenna is approximately 2.7 degrees. This angular width means the vertical height of the beam spreads with range so the height estimation error also increases with range. If the nature of a radar target is unknown, the resolution error may be R*tan(2.7 deg) where R is the range. Since the nature of the target along with the antenna beam shape is generally known, the vertical resolution can be increased by a technique called beam deconvolution; the beam shape may be divided out of the sensed radar measurement. Beam deconvolution may allow vertical resolution to be improved by a factor of two, reducing the resolution error due to beamwidth to about 0.5*R*tan(2.7 deg).

Additional range-dependent error may be present due to the radar vertical sampling interval. Hazard warning system 10 performs vertical assessments at ⅛ degree intervals, which may results in a peak to peak vertical error of R*tan(0.125 deg).

The radar may not be capable of directly detecting clear air hazards above convective cells. Significant turbulence may be experienced as high as 1500 meters above the radar-detectible storm top with an average clear air turbulence height of about 950 meters above the radar top. Even if an average estimate of 950 meters is added to the displayed storm top to account for the average height of the clear air turbulence, variation in clear air turbulence estimates result in a peak to peak variance of about 900 meters.

According to one exemplary embodiment, hazard estimation 110 including a display color ($dBZ_{color}$) for output to display 16 may be calculated or modified based on measured reflectivity ($dBZ_{meas}$), the true airspeed of the aircraft (TAS), the normal speed for the specific aircraft and altitude ($TAS_{norm}$), the aircraft wing loading estimated from a takeoff weight minus the amount of fuel burned (WingLoad), the normal wing loading for the specific aircraft ($WingLoad_{norm}$), the gain for the airspeed in a range of about 3 to about 3.5 (K1), and the gain for the wing loading in a range of about 1.3 to about 1.7 (K2), for example according to an equation similar to equation 1 below:

$$dBZ_{color} = dBZ_{meas} + \max\left(\min\left(K1\left(\frac{TAS}{TAS_{norm}} - 1\right) + K2\left(\frac{WingLoad_{norm}}{WingLoad} - 1\right), 5\right), -5\right) \quad (1)$$

Normal wing loading typically ranges from approximately 30-135 lb/ft-ft over various classes of aircraft, although there are exceptions. Typically, air transport class aircraft have wing loading ranging from about 80-135 lb/ft-ft, while regional jets and heavy business aircraft may have wing loading between about 60-90 lb/ft-ft and lighter business aircraft may have wing loading ranging from about 30-60 lb/ft-ft, again there are overlaps and exceptions. An aircraft may carry ¼ to ½ of its weight as fuel, passengers, and cargo, so wing loading can vary from flight to flight based on cargo/passenger loading and can vary within the period of a single flight as fuel burns off. For example, an aircraft that starts a flight with a full fuel load may initially have a wing loading of about 130 lb/ft-ft but at the end of the flight may have reduced its weight by about 20% due to fuel burn and thus may end the flight with a wing loading of about 104 lb/ft-ft.

An exemplary aircraft may have a true airspeed 130% of the normal air speed for that aircraft at that altitude and a wing loading 80% of the normal wing loading. For a measured reflectivity of about 29 dBZ, which is typically displayed as a green color, and using these aircraft parameters (and assuming a K1 gain of 3.5 and a K2 gain of about 1.7), the reflectivity may be adjusted from about 29 dBZ to about 30.5 dBZ and the output to the display (e.g., display 16) may be adjusted from a green color to a yellow color. Another exemplary aircraft may have a true airspeed 80% of the normal air speed for that aircraft at that altitude and a wing loading 95% of the normal wing loading. For a measured reflectivity of about 40.1 dBZ, which is typically displayed as a red color, and using these aircraft parameters, the reflectivity may be adjusted from about 40.1 dBZ to about 39.5 dBZ and the output to the display (e.g., display 16) may be adjusted from a red color to a yellow color. It is noted that these exemplary aircraft are only examples of two aircraft at two specific points in time and according to other exemplary embodiments, other aircraft parameters, gains, and measured reflectivity may be used. Similarly, other equations configured to determine an adjusted reflectivity based on aircraft parameters may also be used.

According to various exemplary embodiments, the process flow of FIGS. 3, 4A, and 4B may be embodied as hardware and/or software. In exemplary embodiments where the processes are embodied as software, the processes may be executed as computer code on any processing or hardware architecture or in any weather radar system such as the WXR-200 available from Rockwell Collins.

Figure 5:
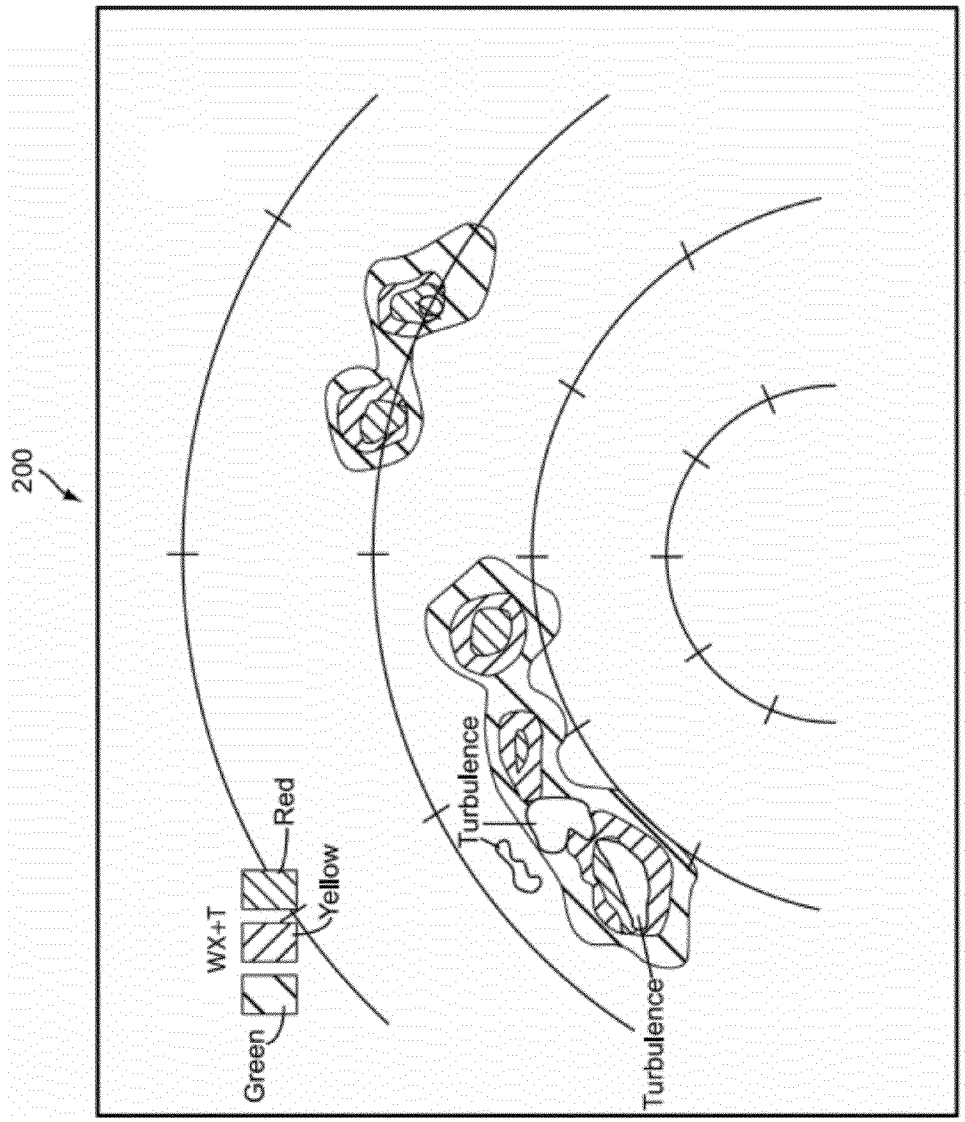
FIG. 5 is a screenshot of the horizontal display in the functional flow diagrams of FIGS. 4A and 4B according to an exemplary embodiment.

Referring to FIG. 5, a screenshot 200 of horizontal view 102 provides reflectivity scaled as moisture content and turbulence scaled to RMS vertical load according to an exemplary embodiment. The moisture content may be illustrated by the colors green, yellow, and red (represented by the legend in the FIG) and both directly measured and/or inferred turbulence may be represented as another color such as magenta. Alternatively, inferred turbulence may be represented differently than directly measured turbulence. In one exemplary embodiment, inferred turbulence may be the same color as directly measured turbulence, but the inferred turbulence indication may be stippled or cross-hatched. According to another exemplary embodiment, the inferred turbulence may be of a different color than the directly measured turbulence.

Additionally, the color conventionally used to display the moisture content may be varied to represent hazards based on aircraft parameters. For example, if there is a high aircraft speed or low wing load, the aircraft may be more susceptible to hazards and a moisture content with a yellow color code may be changed to a red color code to more accurately display the level of hazard to the aircraft. The color code may be generally adjusted to account for the determined hazard level.

It is noted that while the hazard level is generally described above as being updated by changing a color characteristic, according to other exemplary embodiments, the hazard level may include other characteristics such as weight, shading, gradient, cross-hatching, and/or line dashing. Each of these characteristics along with or instead of color may be updated or modified to update an indication of a severity of the hazard level without removing the hazard from the display or changing the area or size of the hazard on the display.

Figure 6:
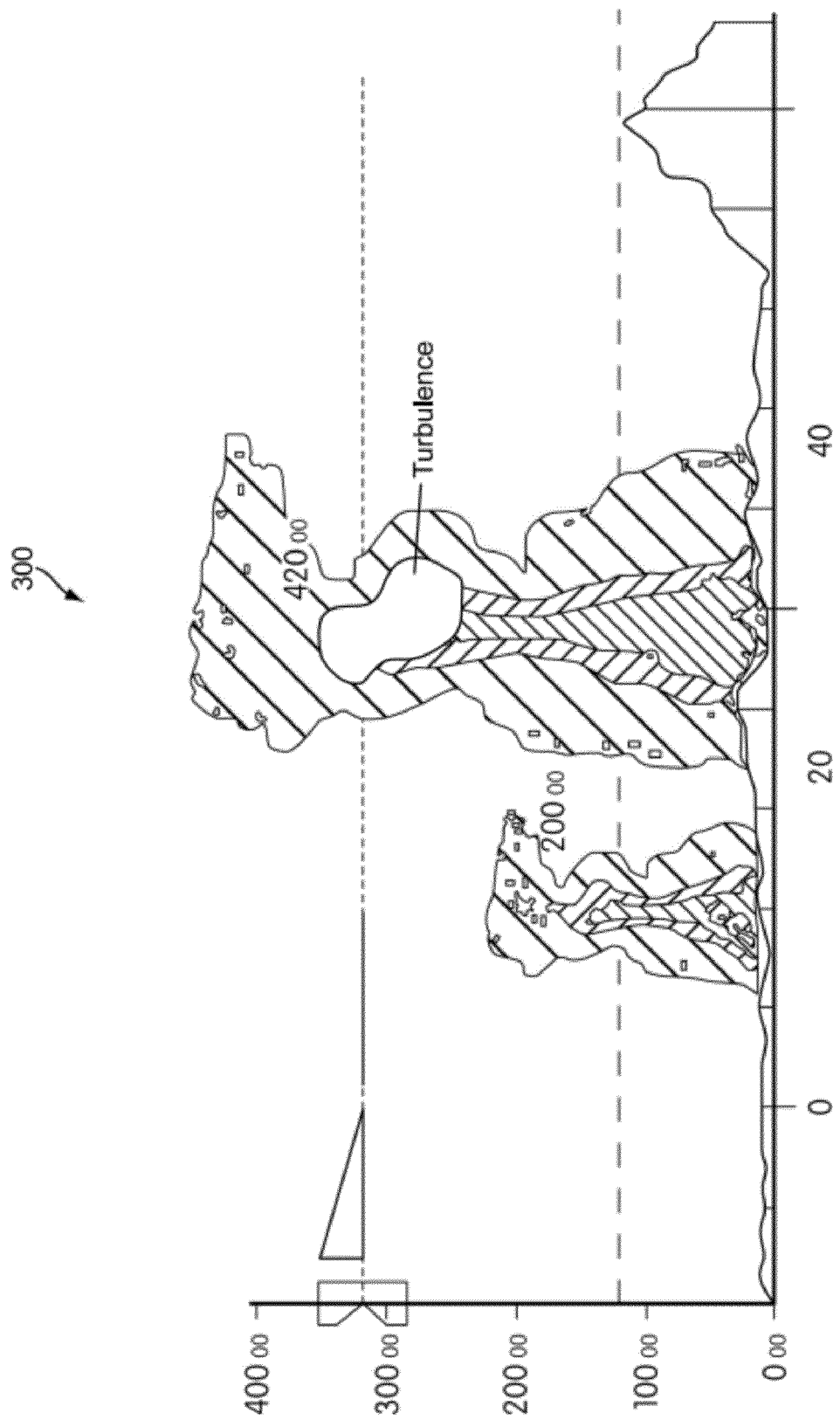
FIG. 6 is a screenshot of the vertical display in the functional flow diagrams of FIGS. 4A and 4B according to an exemplary embodiment.

Referring to FIG. 6, a screenshot 300 of vertical view 104 provides vertical reflectivity scaled as moisture content (e.g., green, yellow, and red) according to an exemplary embodiment. Screenshot 300 shows the vertical profile of two example storms with heights of 20000 and 42000 feet over a distance of about 60 nautical miles. The lower dashed line across screenshot 300 gives an estimated minimum altitude for an aircraft to fly to avoid terrain hazards.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An aircraft hazard warning system configured to provide an indication of a hazard level to an electronic display, comprising:
    an input configured to receive first input data and second input data, the first input data comprising at least one of lightning detection data, radar reflectivity data, turbulence data, geographic location data, vertical structure analysis data, and temperature data, the second input data comprising wing loading data, wherein the wing loading data comprises aircraft configuration data; and
    processing electronics configured to determine a hazard level of the aircraft based on the first input data, the processing electronics further configured to update at least one characteristic of the hazard level based on the second input data, the processing electronics providing an indication of the hazard level comprising the updated at least one characteristic to the electronic display;
    wherein the aircraft configuration data comprises at least one of flap configuration, landing gear position, speed brake status, spoiler configuration, wing size, and wing geometry.

2. The aircraft hazard warning system of claim 1, wherein the at least one characteristic comprises a color for graphical representation of the hazard level on the electronic display, the color being modified based on the second input data to indicate a severity of the hazard level.

3. The aircraft hazard warning system of claim 1, wherein the at least one characteristic comprises at least one of a line weight, shading, gradient, cross-hatching, and line dashing for graphical representation of the hazard level on the electronic display, the at least one characteristic of the hazard level being modified based on the second input data to indicate a severity of the hazard level.

4. The aircraft hazard warning system of claim 1, wherein the aircraft speed data comprises a sensed aircraft speed.

5. The aircraft hazard warning system of claim 1, wherein the processing electronics is configured to use the altitude data to determine aircraft speed.

6. The aircraft hazard warning system of claim 1, wherein the particle size data indicates a size of at least one of air particles, precipitation, and an obstacle, a larger particle size causing a higher hazard level than a smaller particle size.

7. The aircraft hazard warning system of claim 1, wherein a higher aircraft speed causes a higher hazard level than a lower aircraft speed.

8. The aircraft hazard warning system of claim 1, wherein a lighter wing load causes a higher hazard level than a heavier wing load.

9. A method of providing an indication of a hazard to an electronic aircraft display in an avionics system, comprising:
    receiving first input data comprising at least one of lightning detection data, radar reflectivity data, turbulence data, geographic location data, vertical structure analysis data, and temperature data;
    receiving second input data comprising wing loading data, wherein the wing loading data comprises aircraft configuration data;
    determining a hazard level of the aircraft based on the first input data using processing electronics;
    updating at least one characteristic of the hazard level based on the second input data using the processing electronics; and
    providing an indication of the hazard level comprising the updated at least one characteristic to the electronic aircraft display,
    wherein the aircraft configuration data comprises at least one of flap configuration, landing gear position, speed brake status, spoiler configuration, wing size, and wing geometry.

10. The method of claim 9, wherein the at least one characteristic comprises a color for graphical representation of the hazard level on the electronic aircraft display, the color being modified based on the second input data to indicate a severity of the hazard level.

11. The method of claim 9, wherein the at least one characteristic comprises at least one of a line weight, shading, gradient, cross-hatching, and line dashing for graphical representation of the hazard level on the electronic aircraft display, the at least one characteristic of the hazard level being modified based on the second input data to indicate a severity of the hazard level.

12. The method of claim 9, wherein the aircraft speed data comprises a sensed aircraft speed or wherein the processing electronics is configured to use the altitude data to determine aircraft speed.

13. The method of claim 9, wherein the particle size data indicates a size of at least one of air particles, precipitation, and an obstacle, a larger particle size causing a higher hazard level than a smaller particle size.

14. The method of claim 9, wherein a higher aircraft speed causes a higher hazard level than a lower aircraft speed.

15. The method of claim 9, wherein a lighter wing load causes a higher hazard level than a heavier wing load.

16. An apparatus for providing an indication of a hazard to an aircraft display in an avionics system, comprising:
    means for receiving first input data comprising at least one of lightning detection data, radar reflectivity data, turbulence data, geographic location data, vertical structure analysis data, and temperature data;
    means for receiving second input data comprising wing loading data, wherein the wing loading data comprises aircraft configuration data;
    means for determining a hazard level of the aircraft based on the first input data;
    means for updating at least one characteristic of the hazard level based on the second input data; and
    means for providing an indication of the hazard level comprising the updated at least one characteristic to the aircraft display;
    wherein the aircraft configuration data comprises at least one of flap configuration, landing gear position, speed brake status, spoiler configuration, wing size, and wing geometry.

* * * * *